United States Patent [19]

Hickerson

[11] Patent Number: 5,044,527

[45] Date of Patent: Sep. 3, 1991

[54] LIQUID DISPENSING SYSTEM

[76] Inventor: Frederick R. Hickerson, R.D. 6, Box 530, Newton, N.J. 07860

[21] Appl. No.: 400,492

[22] Filed: Aug. 30, 1989

[51] Int. Cl.⁵ .............................................. G01F 11/00
[52] U.S. Cl. ..................................... 222/451; 222/456
[58] Field of Search ............... 222/454, 456, 476, 500, 222/545, 477, 451; 220/240, 304; 215/270

[56] References Cited

U.S. PATENT DOCUMENTS

| | | | |
|---|---|---|---|
| 2,149,989 | 3/1939 | Ashley | 222/454 |
| 3,076,581 | 2/1963 | Booth | 222/456 |
| 4,582,230 | 4/1986 | Vierkötter | 222/500 |

FOREIGN PATENT DOCUMENTS 848527  9/1960  United Kingdom ................ 222/365

Primary Examiner—Michael S. Huppert
Assistant Examiner—Anthoula Pomrening
Attorney, Agent, or Firm—Eugene E. Renz, Jr.

[57] ABSTRACT

A device for dispensing a predetermined quantity of the contents of a container, including a container for the contents. The container has a base to locate the container in an upright position and has a generally upwardly facing opening. The device also includes a chamber on the container which has a first end in communication with the opening and a second end open to dispense contents from the chamber when the container is moved from an upright position to cause the contents to enter the chamber. Also, the device is provided with a valve spool mounted inside the chamber for regulating the quantity of contents flowing through the opening into the chamber. The valve spool includes a piston for leading the flow of contents from the first end of the chamber to the second end. The valve spool further includes a valve for closing the opening at the first end after the chamber receives the predetermined quantity.

9 Claims, 3 Drawing Sheets

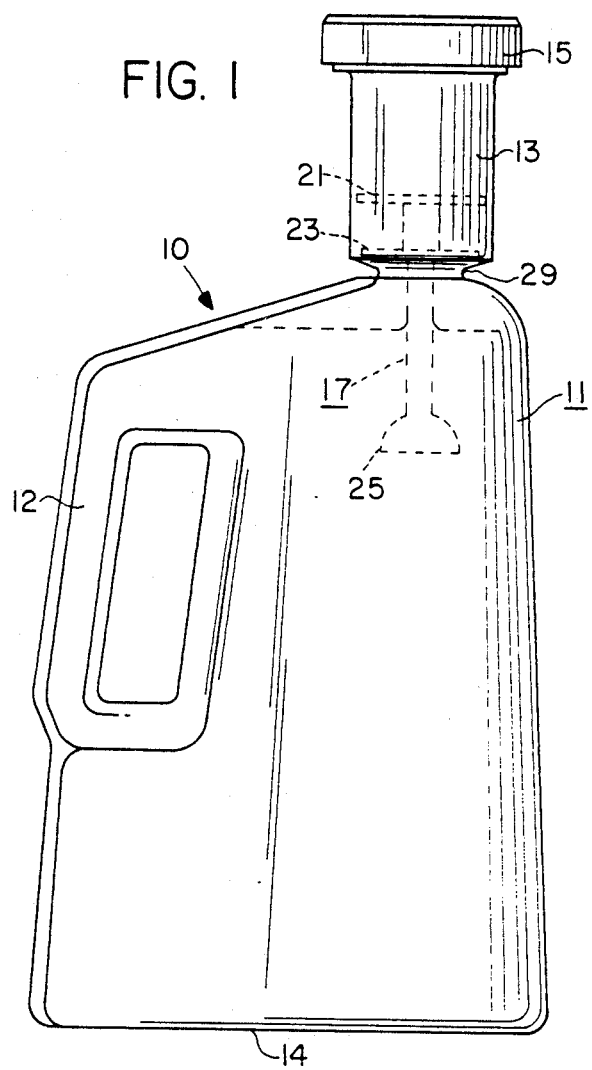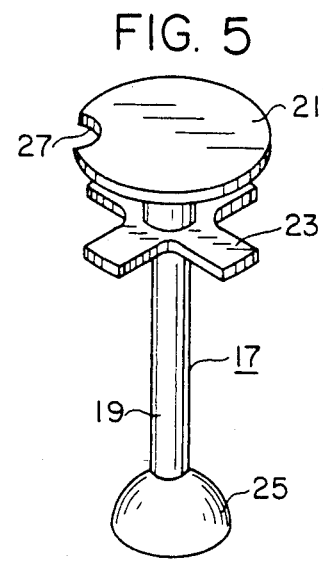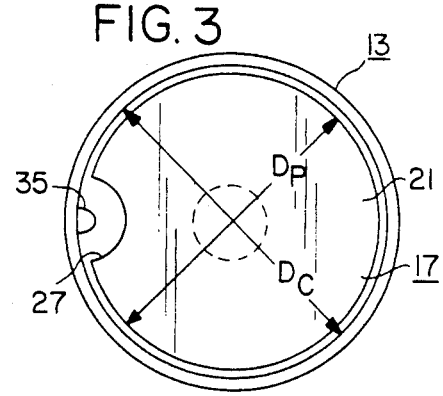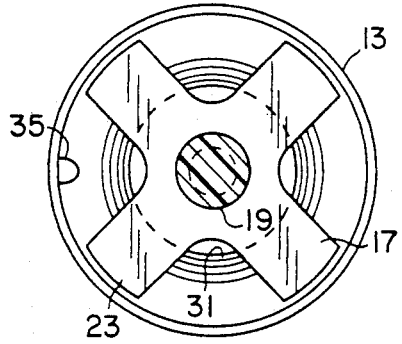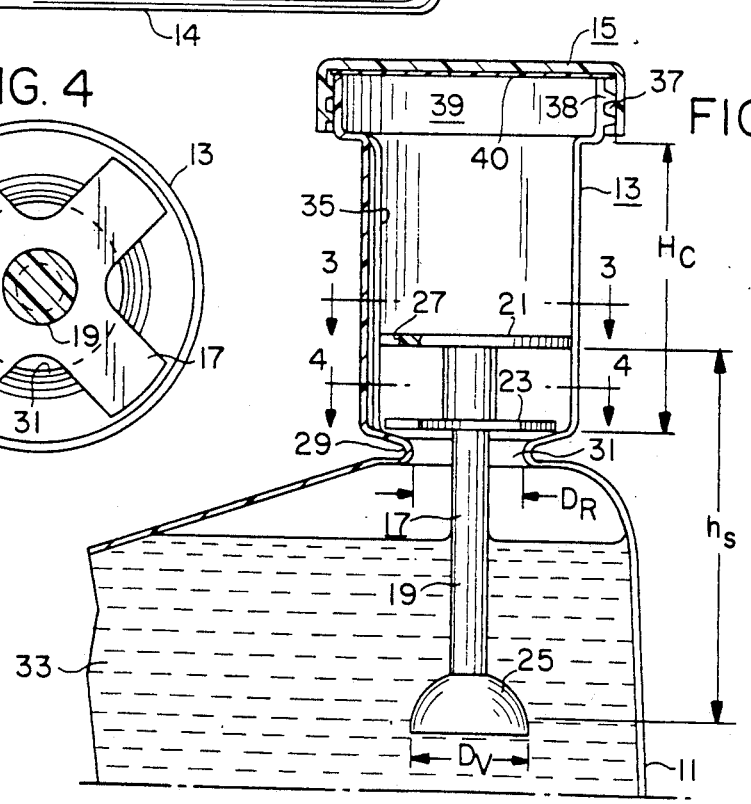

FLUID FILL JUST PRIOR TO DISCHARGE

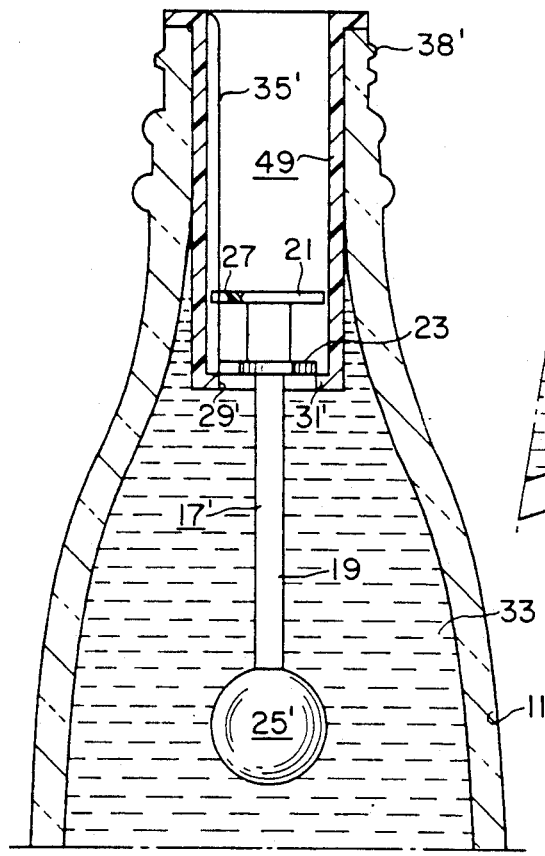
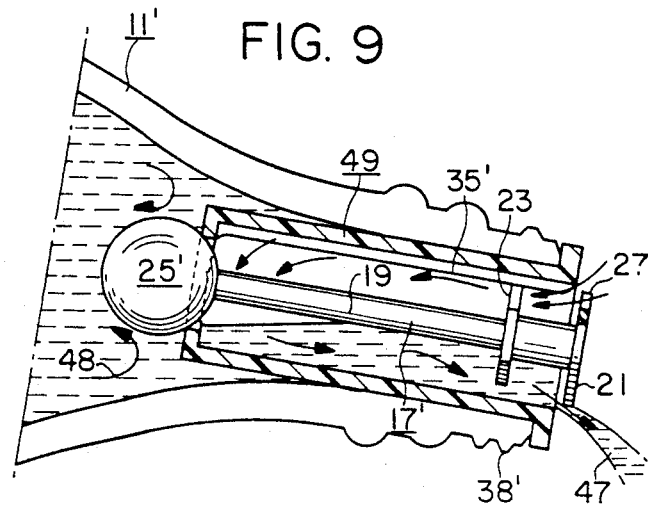
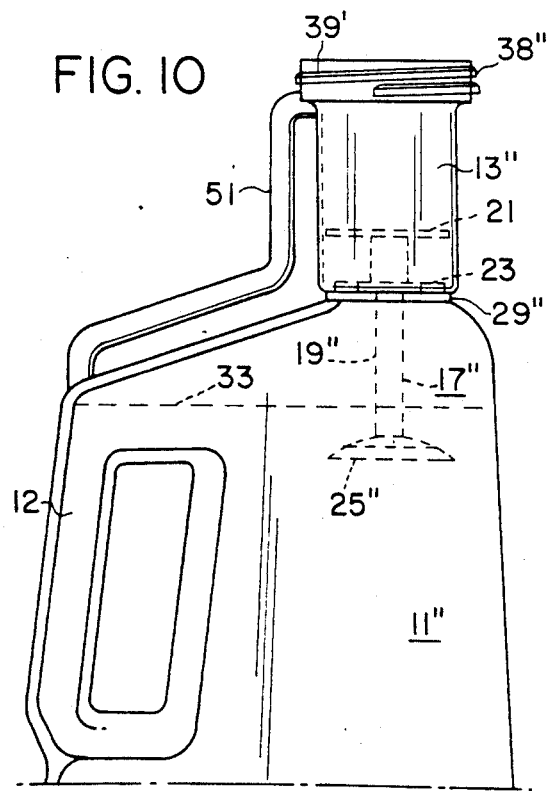
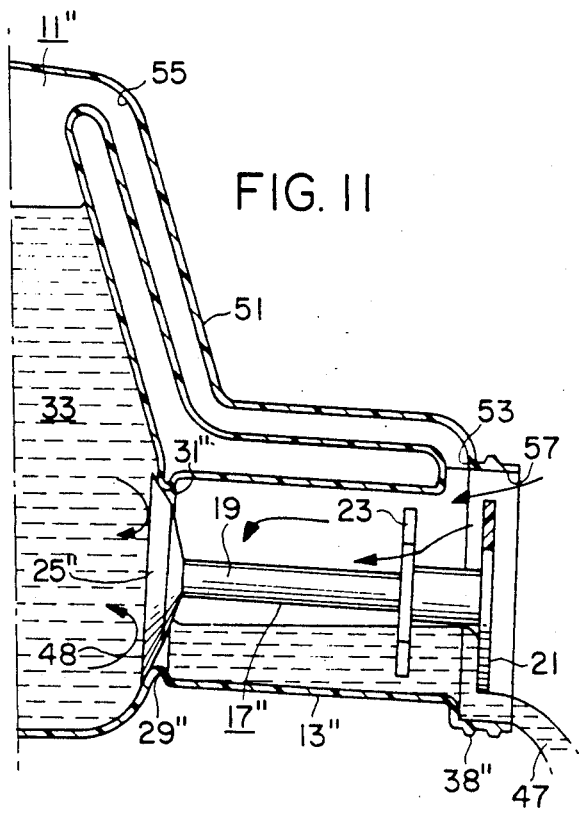

LIQUID DISPENSING SYSTEM

FIELD OF THE INVENTION

The present invention relates to devices suitable for dispensing predetermined quantities of the contents of a container, such as liquid detergents, soaps, bleaches, fabric softeners and the like.

BACKGROUND OF THE INVENTION

Products such as liquid detergents, soaps, bleaches, fabric softeners and the like are currently being sold in containers which require the user to determine the amount of liquid to use for a specific use of the product. Some of these containers have caps which may serve as a measuring cup to assist the user in pouring out a desired quantity of the product and, hopefully, to keep the measuring cup close at hand after the product has been opened, such as in the laundry room and the like. Instructions on the containers provide the user with helpful information in determining the correct or optimum amount of liquid bleach, for example, to use for the intended size of the laundry load, type of clothes being cleaned and particular fabrics.

It has been found, however, in a survey of users of such household liquids that most people merely pour out an estimated amount of the liquid based primarily upon their own judgment and experience, or lack thereof. Very few users bother to take the time to measure the quantity, either with the measuring cup or not, because doing so requires extra time and two hands to add the product to the laundry machine. As a result, the quantity of product used for similar jobs varies greatly from individual to individual. This happens in spite of the known fact that using too much or too little of the product will greatly effect the success of the job, whether it is in cleaning, wash or softening fabric or whatever. Obviously, using too much product is wasteful and expensive to the user.

While it is generally recognized by bottle and cap manufacturers that a container dispensing system which is capable of providing a measured quantity of product is highly desirable, at this time there is no known dispensing system being marketed because of the complexity and resulting unacceptable increase in cost of the product.

It is noted that there is a mouthwash product on the market which contains an adjustable measuring dispensing system. In this system, the user squeezes the mouthwash plastic bottle to force liquid into an upper chamber which is graduated with a scale. Once the user has the proper amount of mouthwash in the upper chamber, the cap of the bottle is removed and the measured amount is poured out. This system utilizes a tiny orifice between the upper and lower chambers. It also includes a vent tube to the bottom of the bottle to carry the fluid and to vent the bottle when hand pressure is released. Such a system could not be applied to the liquid detergent market and similar systems and would be totally unfeasible. Because of complexity, high cost and most importantly, technical problems dealing with the orifice, vent tube and squeezable bottle, such a system could not be employed.

There have also been other attempts to regulate the quantity of liquid removed from containers. In 1886 U.S. Pat. No. 345,112, a double ended valve is placed in a cork in the neck of a bottle. This structure is added to the existing bottle so that the stopper supports the mechanism. There is no provision for using the bottle itself as part of the valve seat and there is no vent means provided. The design further employs a ball valve at the top of the mechanism and is clearly an expensive, decorative design intended for liquids which are to be consumed. It is typical of designs which would not be acceptable in the plastic bottle and cap industry because of intricacy and cost.

Other prior art patents are equally ineffective in suggesting a product useful for today's markets. Specifically, Brawner U.S. Pat. No. 646,349 describes a device for allowing a limited quantity of contents to be removed when the bottle is inverted and shaken. This is accomplished by a stopper which prevents escape of the contents unless the bottle is agitated, causing the stopper to move up and down. It does not appear that a measured quantity is likely to be removed from a container. Similarly, U.S. Pat. No. 1,039,592, issued to Ray, describes a device which is designed for use with a bottle having an enlarged portion on its neck and a spider structure valve which engages a plurality of seats in the bottle. This design requires an unusual step function in the neck to provide a plurality of valve seats, none of which are valves which are seated from below. Finally, Jockers U.S. Pat. No. 2,630,593 employs a restricted passage and auxiliary chamber leading to a brush so that the brush acts as a piston to facilitate the feed of the liquid. This is a metering apparatus feeding liquid to the brush and is not a true dispensing system.

None of the above prior art teach or even suggest a dispenser which would accomplish the objects of the present invention. Prior art materials of the type described above do not offer a simple, reliable, inexpensive and acceptable solution to the problem first described above. The product must be easy to manufacture and simple to use. Otherwise, the product will be too expensive or the consumers will merely ignore the device and continue to use an estimated amount as is their current practice.

Accordingly, it is a principal object of the present invention to provide a container dispensing system for liquids and flowable powders by providing a greatly simplified and inexpensive device for dispensing a predetermined measured amount for each time the container is used.

Another object of this invention is to provide a container dispenser for liquids and flowable powders which is easy, convenient and desirable to use and which is pleasantly acceptable to a consumer.

Yet another object of this invention is to provide a device for use in which only one hand is needed to pour the predetermined measured amount.

Yet another important object of the present invention is to provide a container dispenser of the type described which can be manufactured using a proven manufacturing technology and practices without special, difficult or complicated production or assembly requirements.

SUMMARY OF THE INVENTION

It has now been discovered that the above and other objects of the present invention may be accomplished using the following device. Specifically, a device for dispensing a predetermined quantity of the contents of a container has been discovered. The container for the contents, such as bleach, soaps, detergents and softeners, for example, are contained in a container having a base which positions the container in an upright position and also has a generally upwardly facing opening in the container. A chamber is positioned on the container having a first end in communication with this upward facing opening. The chamber also has a second end open to dispense the contents from the chamber when the container is moved from an upright position to cause contents to enter into the chamber.

The device includes a valve spool means which is mounted inside the chamber for regulating the quantity of the contents which flow through the opening into the chamber and are thereafter dispensed. The valve spool includes a piston means for leading the flow of contents from the first end of the chamber to the second end for dispensing. The valve spool further includes valve means for closing the opening in the container at the first end of the chamber after the chamber receives the predetermined quantity of contents. The valve means keeps the container opening closed until the container is returned to an upright position.

BRIEF DESCRIPTION OF THE DRAWINGS

These and other objects of the present invention and the various features and details of the operation and construction thereof are hereinafter more fully set forth with reference to the accompanying drawings, where:

FIG. 1 is a side elevational view of a typical liquid container, having an integrally attached, single shot, pre-determined liquid volume, dispensing means. A pre-determined volume of liquid being dispensed upon each single handed pouring motion of the uncapped container, all in accordance with this invention;

FIG. 2 is an enlarged fragmentary sectional view of the upper portion of the liquid container, showing details of construction of the constant volume liquid dispensing valve means in accordance with this invention;

FIGS. 3 & 4 are enlarged sectional plan views taken on the line 3,3 and 4,4 of FIG. 2 showing, additional details of construction;

FIG. 5 is a pictorial view of the single piece valve body;

FIG. 8 is an enlarged fragmentary sectional elevational view illustrating a modification of the foregoing dispensing means as adapted to a narrow necked glass container;

FIG. 9 is a fragmentary sectional elevational view illustrating the dispensing mode of the modified valve shown in FIG. 8;

FIG. 10 is a fragmentary side elevational view of still another modification of the foregoing dispensing means showing a bypass tube; and FIG. 11 is an enlarged fragmentary sectional elevational view illustrating the dispensing mode of the modified valve shown in FIG. 10.

DETAILED DESCRIPTION OF THE PREFERRED EMBODIMENT

Figure 6:
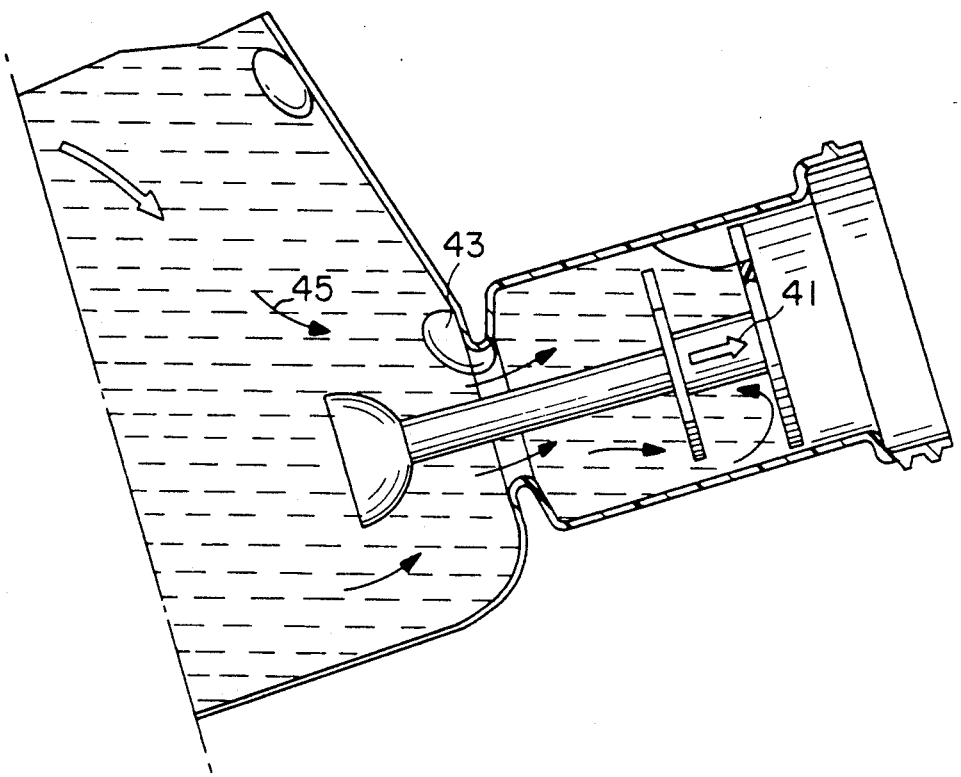
FIGS. 6 & 7 are fragmentary sectional elevational views similar to FIG. 2 illustrating sequentially the mode of operation.
Figure 7:
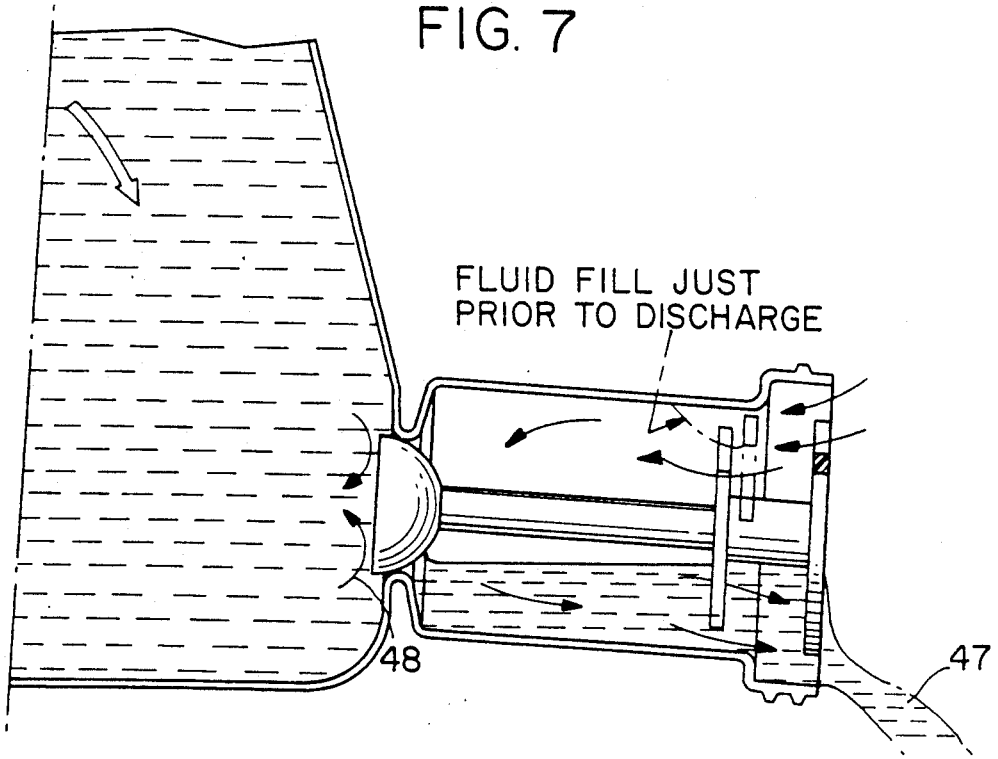

As shown in the figures, a container 10 is provided which is suitable for a wide variety of products such as liquid detergents, soaps, bleaches, fabric softeners, and other household goods. It is also contemplated that other liquids and flowable solids may be dispensed with the container dispenser of the present invention in larger or smaller containers as desired.

The bottle 11 has a handle 12 which allows it to be picked up with one hand and tilted so that the contents can be dispensed from the top chamber 13. The bottle 11 has a base 14 which locates the container in an upright position. Screw type cap 15 is fastened to the chamber 13 to preserve the integrity of the contents in the usual manner. Other closures are equally suitable for the purposes of this invention.

Located within the chamber 13 is a valve spool shown generally as 17. Valve spool 17 includes an elongated stem 19 which extends into the interior of bottle 11. The top end of the valve spool 17 includes an annular piston 21 which is sized to fit the interior of the chamber 13. As shown in FIG. 3, the piston 21 has a diameter, $D_p$, which is only slightly smaller than the diameter of the chamber, $D_c$.

Located between the valve spool 17 and the elongated stem 19 is a spider guide 23 which, like piston 21, is perpendicular to the axis of the valve spool 17. The spider guide 23 includes a plurality of radially extending portions and a plurality of radially restricted portions, as seen in FIG. 4. The purpose of the guide 23 is to maintain the piston 21 in a generally perpendicular orientation with respect to the axis of the valve spool 17.

A valve means 25 is placed at the other end of the elongated stem 19. The valve means 25 may be spherical as shown in FIGS. 2 and 5, or other conventional valve shapes.

As is most easily seen from FIGS. 3 and 5, the piston 21 includes a vent 27 which is shown as being semi-circular in shape but which can take any shape desired. The function of the vent is to provide a path for air to enter the container 11 when fluid is flowing out of the container.

The container itself has a generally upwardly facing opening defining a restricted throat 29. The restricted throat 29 has a diameter, $D_r$, shown in FIG. 2, which is smaller than the diameter of the valve member 25. The restricted throat 29 includes a valve seat 31 which allows the valve 25 to form a seal preventing further flow of fluid 33 out of the bottle 11 when the valve 25 is in operating engagement with the valve seat 31.

The chamber 13 also includes a rib 35 which fits within the region defined by vent 27 and which is attached to the inner wall of the chamber 13. Rib 35 is located on the same side of chamber 13 as is the handle 12, so that when the bottle 11 is lifted and tipped to discharge a quantity of liquid, the vent 27 will remain centered about rib 35.

The cap 15 is shown in FIG. 2 as having threads 37 which cooperate with the finish 38 of the enlarged top of chamber 13. A tamper proof or freshness seal 40 can be applied across the enlarged top 39 of the chamber 13.

The device of the present invention is admirably suited to dispense a predetermined quantity of the contents of the container when it is tipped to pour out the contents, such as to add a quantity of detergent to a washing machine. For example, a laundry detergent container utilizing the invention dispensing system described herein could be designed to provide a set measured amount of detergent during a single pour. This single pour would be sufficient for a small load of laundry. Two pours, defined as two separate tiltings of the container from the upright or standing position to the pouring position, would be sufficient for a normal load of laundry. Similarly, three pours would be sufficient for a heavy load. Of course, the full amount contained in the chamber does not need to be poured out since return of the container to the upright position will stop flow of the contents. The remaining portion in the chamber will run back into the container and will not affect the next pour.

As shown in FIG. 6, the device of the present invention has been picked up and tilted into a prepouring position. The cap 15 has, of course, been removed as has the protective cover 40. As the bottle 11 is tilted, the liquid or very free flowing powder 33 flows through the restrictive throat 29 into the region past the spider guide 23 and up to an against annular piston 27. As the fluid enters the chamber 13, the valve spool 17 is moved in the direction of arrow 41. Simultaneously, air flows through vent 27 in the form of bubbles 43 back into the container 11 and against the direction of the flow of fluid shown by arrow 45.

The spider guide 23 maintains the spool 17 in a centered position in the chamber 13. The moving fluid pushes the spool toward the container opening in the direction of arrow 45 but does not exit in stream 47 until the spool 17 reaches the enlarged diameter section 39. At this time, the flowing fluid exits around the spool piston 21. Simultaneously at this point, the valve 25 engages valve seat 31 in restrictor throat 29, thereby preventing flow of fluid as shown by arrow 48. Turning the container 11 back to the upright position shown in FIG. 1, for example, allows the valve spool 17 to drop back to its starting position. This allows undispensed fluid to return to the bottle 11 through restricted throat 29 and resets piston 21 at the position predetermined to give the desired quantity of contents for each time the device is used to pour contents from the bottle 11.

The amount of contents which are dispensed can be set in advance. Factors which affect and control the set measured amount include the diameter of the valve piston 21, the difference between Dp and Dc, the area and location of the vent 27, the diameter of the restricted throat 29, the length of the upper chamber, shown as Hc in FIG. 2 and the length that the piston 21 is above the valve member 25, shown as $h_c$ in FIG. 2. Additionally, the weight and specific gravity of the components of the valve spool 17 will have some affect on the amount of fluid that can flow, pushing the piston 21 and thereafter escaping from enlarged end 39 before the valve 25 seats in valve seat 31. As long as the contents 33 are flowable, the density and viscosity of the flowing fluid 33 have only a small effect on the measuring system. The system is basically constructed to operate on fluid volume control, rather than density and viscosity factors.

Tests have been conducted to measure the amount of fluid exiting from various embodiments of the present invention. It has been noted that the rate will vary slightly, due to rate or quickness of pouring and the position of the container when pouring. However, the total variation of the amount of fluid between pours, for any given system, remains well within acceptable limits. For example, laundry detergents, bleaches, fabric softeners and other commonly dispensed liquids are dispensed by the device of the present invention as well as or better than current systems where amounts are poured into measuring cups. Variations between pours and between individuals during actual usage of measuring cups is greater than the variation when the device of the present invention is employed.

An alternative embodiment is shown in FIGS. 8 and 9. In this device, the bottle 11' has an insert 49 which serves to function in the same way that the chamber 13 functions in the device as previously described. There still remains a restricted throat 29' which includes a valve seat 31' for engagement with the valve 25', shown in this embodiment as a ball valve 25'.

The valve spool 17' includes a piston 21 and vent 27 which is pushed ahead by the fluid 33 when the bottle 11' is tipped. Fluid flows past the spider guide 23 and against piston 21 so that the piston 21 leads the flow of contents from the first end of the chamber 49 to the second or discharged end adjacent threads 38'. Air flows through the vent 27 in piston 21 until the valve 25' and valve seat 31' interrupt or stop flow of the liquid 33. Again, returning the container 11' to its original upright position allows the spool 17' to slide back to its starting position and the pouring procedure can be repeated.

The uniformity of the amount of liquid which is dispensed by one pouring cycle, compared to other pouring cycles, is directly related to the flow of air into the container. The designs shown in FIGS. 1 through 9 are quite suitable for most applications, but it is to be appreciated that the flow of air, such as by bubbles 43 shown in FIG. 6 is a turbulent flow against the liquid 33 as it passes through the restricted throat 29 of bottle 11. Nevertheless, by appropriate design of the notch or vent 27 on piston 21 and the shape of the spider guide 23, air will be drawn into the container as the upper spool end moves forward to discharge fluid into the large diameter portion 39 of the chamber 13.

In FIGS. 10 and 11, an alternative embodiment is shown where the piston 21 very closely fits the inside of chamber 13. Piston 21 does not include a vent 27, but rather, the air which must be replaced in bottle 11' flows through vent return 51 into the handle portion 55 of bottle 11''. Air flows into an inlet 53 as soon as the bottle 11'' is turned to a pouring orientation. Air enters into gap 57 even when the piston 21 is in the position shown in FIG. 10. As the liquid 33 is lead by the piston 21, air flows through gap 57 into inlet 53 and vent return 51. Once the piston 21 clears the inner wall of chamber 13, fluid exits through the enlarged portion 57 and the valve 25 engages valve seat 31'' to close off the restricted throat 29'' of the bottle 11''. In this embodiment, the air flow through vent return 51 is uniform and not affected by the turbulence of the fluid 33 as it follows the piston 21 and fills the chamber 13''. Accordingly, an even more precise predetermined quantity of the contents can be dispensed using this embodiment.

It should also be noted that the assembly of the valve spool 17 into the chamber 13 and bottle 11 can be accomplished even after the chamber 13 has been fastened to the bottle 11. By proper dimensioning of the restrictor throat 29 and the valve 25 on the elongated stem 19, the valve 17 can be forced into position through the restrictive opening 29 without permanent distortion of either part. The assembly force should be high enough to prevent the fluid from pushing the valve 25 back through the throat 29.

What is claimed is:

1. A device for dispensing a predetermined quantity of the contents of a container, comprising:

a container for said contents having a discharge opening;

a chamber on said container having a central axis and side walls extending from a first end in communication with said discharge opening to a second end open to dispense contents from said chamber when said container is positioned to cause said contents to enter said chamber; and first valve means mounted inside said chamber for regulating the quantity of contents flowing through said opening into said chamber, said first valve means including piston means moveable axially from a first inner position at said first end of said chamber to a second outer discharge position adjacent said second end, vent means defining a path for air flow to said container when said piston means moves from said first position to said second position, said piston means including guide means, axially spaced closely to said piston means, confronting and spaced closely to the side wall of said chamber during movement of said piston means from said first position to said second position to align said piston means generally perpendicularly to said axis, second valve means for closing said opening at said first end when said piston is at its second outer discharge position means and said chamber is filled with a predetermined quantity of contents.

2. The device of claim 1 wherein said second end of said chamber includes an enlarged diameter end portion extending beyond the location of said piston means when said second valve means is in flow closing relationship with said chamber opening.

3. The device of claim 1 wherein said second end of said chamber includes a closure.

4. The device of claim 1 wherein said piston means includes said vent means for defining a path for air flow to said container when said piston means is moved to lead the flow of contents in said chamber along a discharge side of said chamber.

5. The device of claim 4 which further includes second guide means for positioning said vent means diametrically opposite said discharge side of said chamber.

6. The device of claim 1 wherein said second valve means has a diameter sufficiently greater than the diameter of the opening to prevent said valve means from passing through said opening during use of the device.

7. The device of claim 6 wherein at least one of said opening and said second valve means are deformable to permit insertion of said valve means into said container under force greater than the greatest amount of force on said valve means during use of said device.

8. The device of claim 1 wherein said chamber is mounted on and positioned above said opening in said container.

9. The device of claim 1 wherein said chamber is mounted within said opening of said container.

* * * * *